US009033347B1

(12) United States Patent
Westrate et al.

(10) Patent No.: US 9,033,347 B1
(45) Date of Patent: May 19, 2015

(54) DOLLY FOR TRANSPORTATION OF A LOAD

(71) Applicant: JWEST LLC, Grandville, MI (US)

(72) Inventors: Joel Westrate, Grandville, MI (US);
Matthew Ruster, Zeeland, MI (US);
Phil Hill, Eagle, MI (US)

(73) Assignee: JWEST LLC, Grandville, MI (US)

( * ) Notice: Subject to any disclaimer, the term of this patent is extended or adjusted under 35 U.S.C. 154(b) by 0 days.

(21) Appl. No.: 14/449,697

(22) Filed: Aug. 1, 2014

Related U.S. Application Data

(60) Provisional application No. 61/861,637, filed on Aug. 2, 2013, provisional application No. 61/923,409, filed on Jan. 3, 2014.

(51) Int. Cl.
*B62B 3/02* (2006.01)
*B62D 63/02* (2006.01)

(52) U.S. Cl.
CPC .. *B62B 3/02* (2013.01); *B62D 63/02* (2013.01)

(58) Field of Classification Search
USPC ........ 280/47.331, 47.12, 47.26, 43.1, 33.995, 280/651
See application file for complete search history.

(56) References Cited

U.S. PATENT DOCUMENTS

| 2,607,502 | A | * | 8/1952 | Willitts | 414/469 |
| 4,343,487 | A | * | 8/1982 | Crothers | 280/654 |
| 4,350,356 | A | * | 9/1982 | Crothers | 280/47.26 |
| 4,541,644 | A | * | 9/1985 | Diener | 280/43.1 |
| 5,088,751 | A | * | 2/1992 | Zint | 280/47.34 |
| 5,513,939 | A | * | 5/1996 | Martin et al. | 414/447 |
| 6,244,603 | B1 | * | 6/2001 | Rizzardi | 280/47.331 |
| 7,011,485 | B2 | * | 3/2006 | Henry | 414/480 |
| 7,036,832 | B2 | * | 5/2006 | Gargaro | 280/47.131 |
| 7,438,300 | B1 | * | 10/2008 | Zien et al. | 280/79.5 |
| 7,651,104 | B1 | * | 1/2010 | Hilt | 280/47.131 |
| 7,661,684 | B2 | * | 2/2010 | Westrate | 280/47.34 |
| 8,544,874 | B2 | * | 10/2013 | Cooper | 280/659 |
| 2003/0020249 | A1 | * | 1/2003 | Webster et al. | 280/43 |
| 2008/0251773 | A1 | * | 10/2008 | Smeeton et al. | 254/113 |

* cited by examiner

*Primary Examiner* — Jeffrey J Restifo
(74) *Attorney, Agent, or Firm* — McGarry Bair PC

(57) ABSTRACT

A dolly for transporting a load comprises a cradle detachably mounted to a handle. The cradle comprises a base having an upstanding rail extending upwardly from the perimeter of the base and terminates at a forward portion of the base to define an opening, a first mounting portion mounted to the front portion of the cradle and a pair of wheels rotatably mounted to the rear portion of the cradle. The handle comprises a least one wheel, a lever arm and a second mounting portion positioned at non-parallel angle with respect the lever arm. The first and second mounting portions are configured to detachable engage so that the handle and cradle can be moved as one unit.

18 Claims, 12 Drawing Sheets

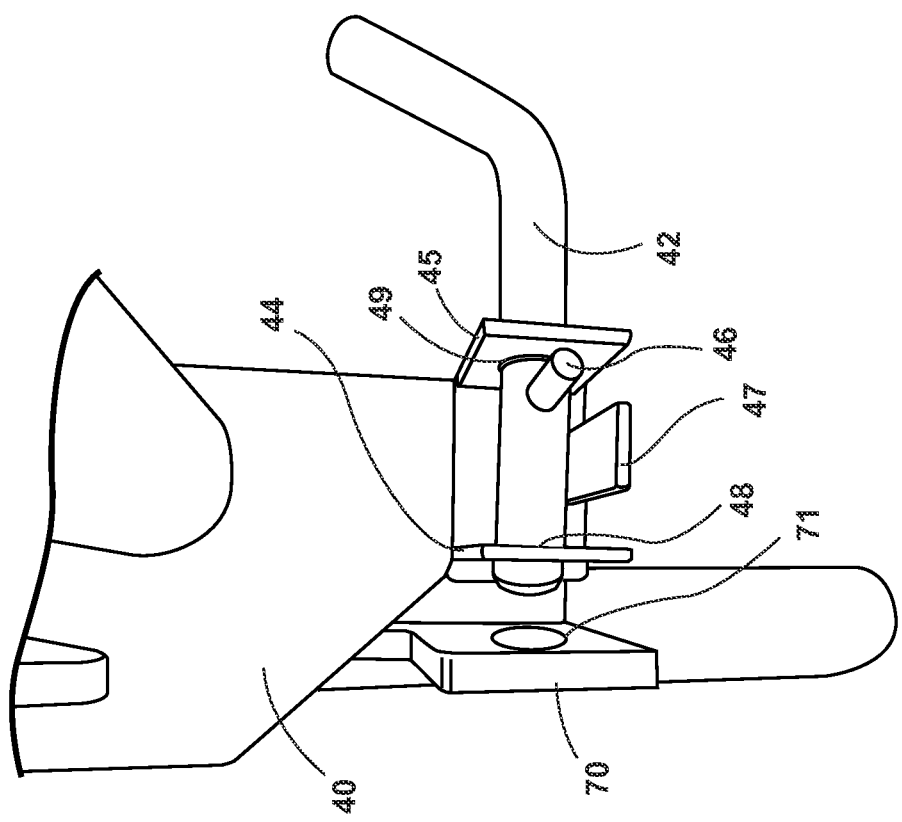
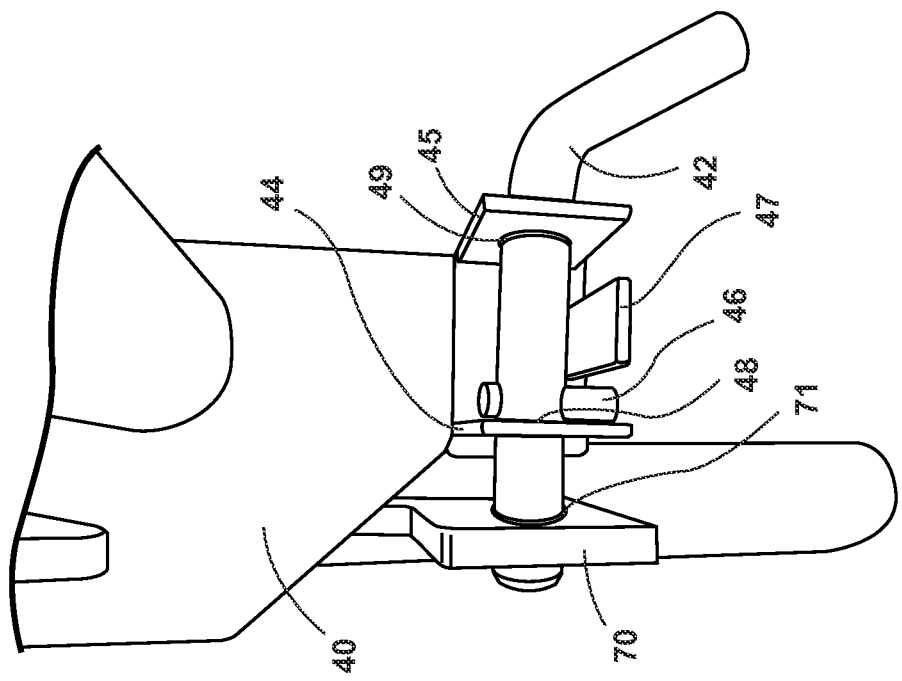

DOLLY FOR TRANSPORTATION OF A LOAD

CROSS-REFERENCE TO RELATED APPLICATION

This application claims the benefit of U.S. Provisional Patent Application No. 61/861,637, filed Aug. 2, 2013, and U.S. Provisional Patent Application No. 61/923,409, filed Jan. 3, 2014, both of which are incorporated herein by reference in their entirety.

BACKGROUND

Landscaping materials such as potted or balled trees or shrubs are commonly transported around the job site by manually lifting and carrying the materials. For larger loads, ball carts and dollies that have large lifting capacities are used. The largest loads are typically moved with diesel fueled front-loaders.

Manually lifting large and heavy potted or balled trees or shrubs is very laborious and cumbersome. Ball carts and dollies position the load towards the user and require a user to balance the load and during transport. This can be cumbersome when hauling wide shrubs or trees with needles. Front-loaders are expensive to haul to job sites, have certain site access limitations and can do turf damage to yards. Therefore, a device is needed that is able to lift and transport heavy loads without the disadvantages associated with the typical devices and methods for lifting and transporting heavy loads of landscaping material.

BRIEF SUMMARY

According to an embodiment of the invention, a dolly for transporting a load comprises a cradle detachably mounted to a handle. The cradle comprises a base having an upstanding rail extending upwardly from the perimeter of the base. The rail terminates at a forward portion of the base to define an opening extending generally the width of the base. A pair of wheels are rotatably mounted to the rearward portion of the cradle and a first mounting portion is positioned at the forward portion of the cradle.

The handle comprises at least one wheel rotatably mounted thereto, a lever arm and a second mounting portion. The second mounting portion is positioned at a non-parallel angle with respect to the lever arm. The second mounting portion is configured to detachably engage the first mounting portion on the cradle when rotated about the at least one wheel to position the second mounting portion in register with the first mounting portion on the cradle.

When a load is position on the base within the cradle, the handle is brought into alignment with the forward portion of the cradle. The second mounting portion can be rotated into a position about the at least one wheel adjacent to the first mounting portion on the cradle and rotated into detachable engagement with the first mounting portion so that the handle and cradle can be moved as a unit to transport the load. When the load is located at a desired end location, the handle can be oppositely rotated with respect to the cradle to disengage the second mounting portion from the first mounting portion. Once disengaged, the load can be easily removed from within the cradle.

BRIEF DESCRIPTION OF THE DRAWINGS

In the drawings:

FIG. 4A is a perspective view of the locking pin in the locked position according to an embodiment of the invention;

FIG. 4B is a perspective view of the locking pin in the unlocked position according to an embodiment of the invention;

DETAILED DESCRIPTION

Figures 1A, 1B:
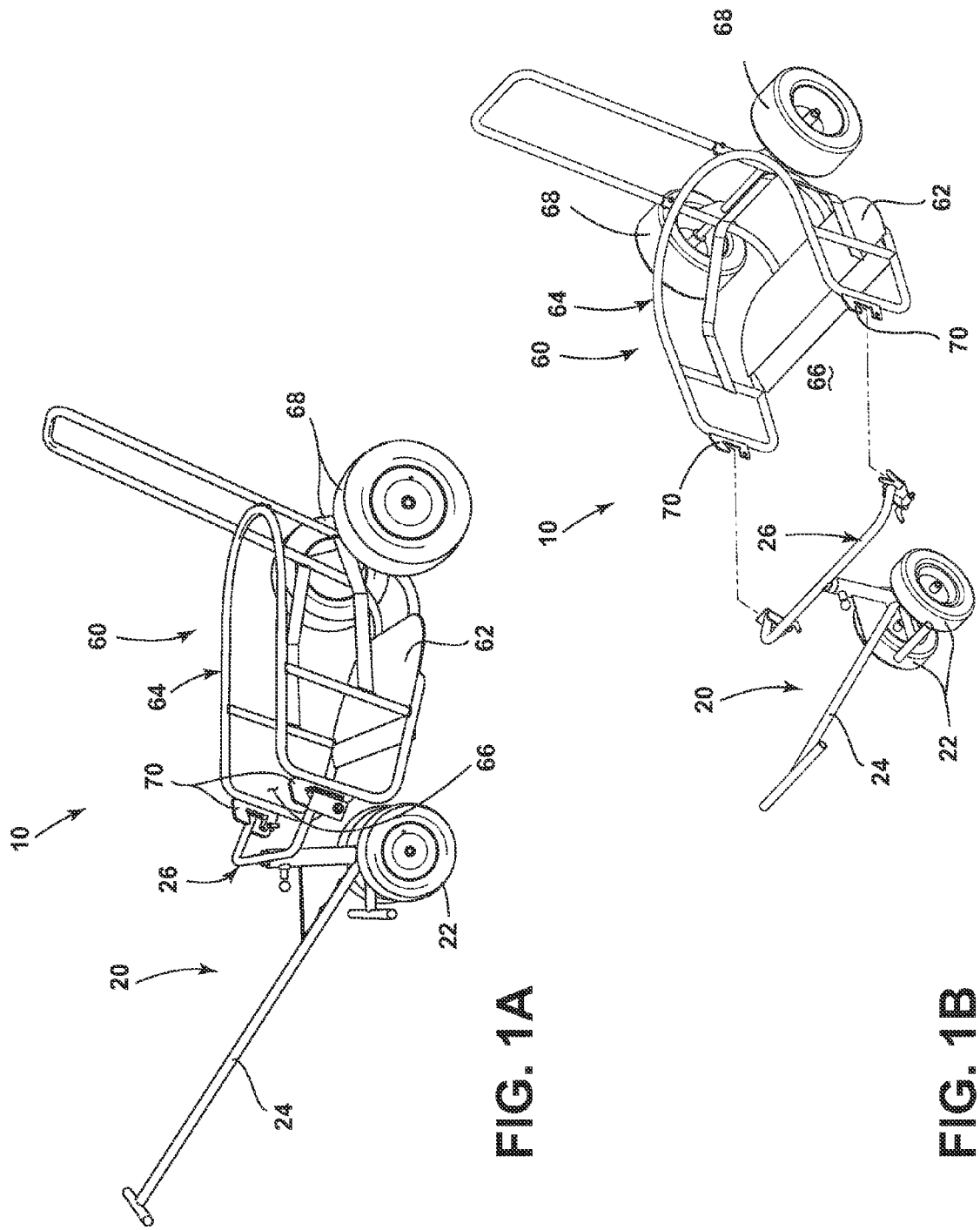
FIG. 1A is a perspective view of the dolly with the handle and cradle engaged according to an embodiment of the invention.
FIG. 1B is a perspective view of the dolly with the handle and cradle disengaged according to an embodiment of the invention.

Turning now to the drawing and to FIG. 1A and FIG. 1B in particular, there is shown a perspective view of a dolly 10 according to an embodiment of the invention. The dolly comprises a cradle 60 and a handle 20. The cradle 60 comprises a base 62 having an upstanding rail 64 extending upwardly from the perimeter of the base 62. The rail 64 terminates at a forward portion of the base 62 to define an opening 66 extending generally the width of the base 62. A pair of wheels 68 is rotatably mounted to the rearward portion of the cradle 60 and a first mounting portion 70 is positioned at the forward portion of the cradle 60.

The handle 20 comprises at least one wheel 22, a lever arm 24 and a second mounting portion 26. The second mounting portion 26 is positioned at a non-parallel angle with respect to the lever arm 24 and the least one wheel 22 is rotatably mounted to the handle 20 at or near the intersection of the lever arm 24 and second mounting portion 26. The second mounting portion 26 is configured to engage the first mounting portion 70 on the cradle 60 so that the handle 20 and cradle 60 can be moved as one unit, as illustrated in FIG. 1A, and to be disengaged from the first mounting portion 70 on the cradle 60 so that the handle 20 and cradle 60 can be moved separately, as illustrated in FIG. 1B.

Figure 2:
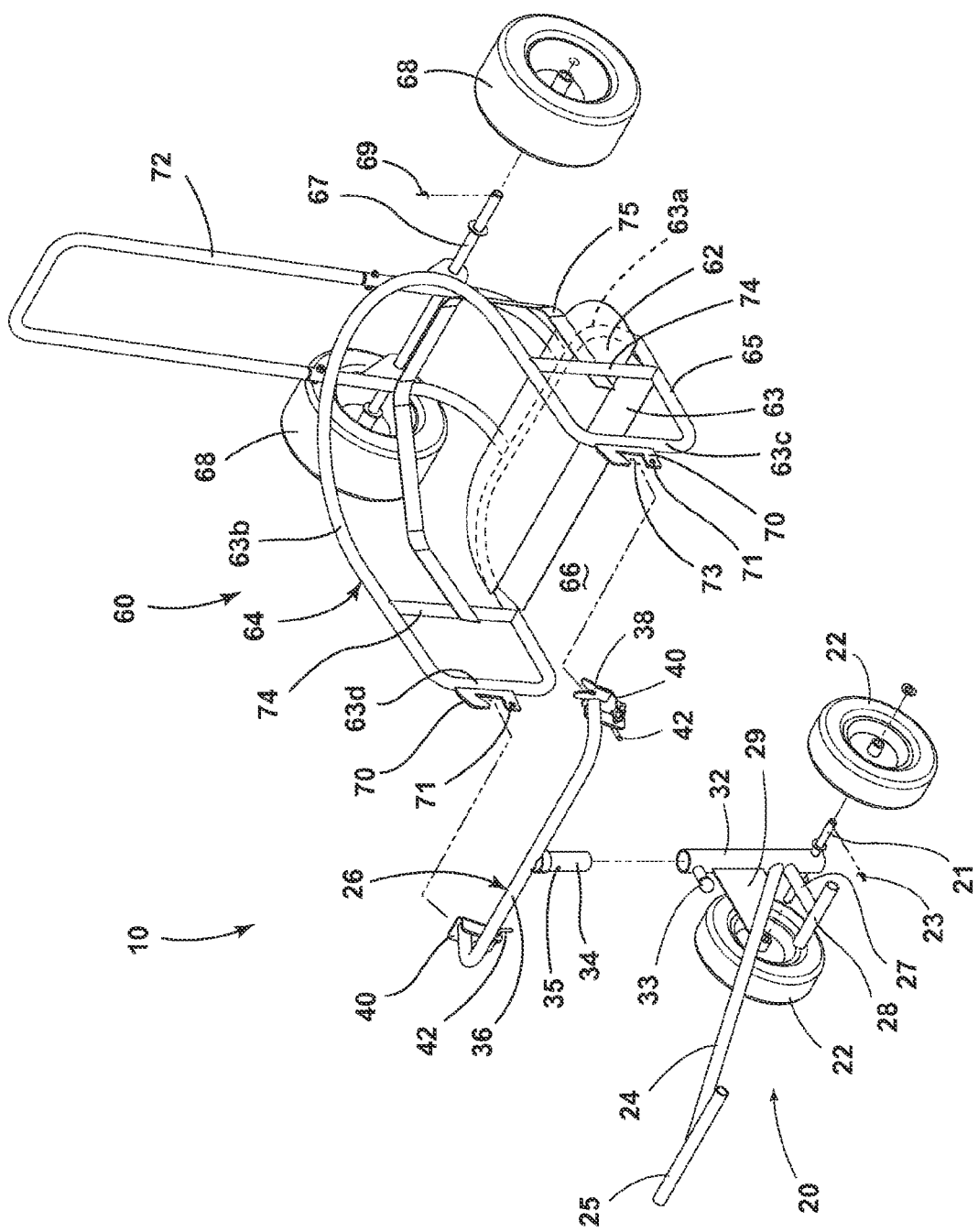
FIG. 2 is an exploded view of the dolly of FIG. 1B according to an embodiment of the invention.

FIG. 2 shows an exploded view of the dolly 10 of FIG. 1B to illustrate the components of the handle 20 and cradle 60. The upstanding rail 64 is primarily formed from a frame piece 65 having a lower horizontal U-shaped bend 65a and an upper horizontal U-shaped bend 65b connected together by two vertical U-shaped bends 65c, 65d. The lower horizontal U-shaped bend 65a supports the base 62 and the space between the legs forms the opening 66. The upper horizontal U-shape bend 65b forms the upper perimeter of the upstanding rail 64. The two vertical U-shaped bends 65c, 65d extend between the legs of the lower and upper horizontal U-shaped bends 65a, 65b on either side of the opening 66 to offset the lower horizontal U-shaped bend 65a from the upper horizontal U-shaped bend 65b such that they extend forwardly beyond the forward portion of the base 62.

The upstanding rail 64 is further reinforced by vertical cross members 74 extending between and affixed to the lower and upper horizontal U-shaped bends 65a, 65b and a horizontal U-shaped bracket reinforcement 75 extending between and affixed to the vertical cross members 74 in the middle of the lower and upper U-shaped bends 65a, 65b of the frame piece 65.

The upstanding rail 64 further comprises an upwardly extending rail 72 having an inverted U-shape that is affixed to the lower and upper horizontal U-shaped bends 65a, 65b of the frame piece 65 at the rearward portion of the base 62 and extends above the upper horizontal U-shaped bend 65b of the frame piece 65 such that the horizontal portion of the upwardly extending rail 72 is parallel to the front of the base 62 extending across the opening 66. The portion of the upwardly extending rail 72 located above the upper horizontal U-shaped bend 65b may be detached from the lower portion of the upwardly extending rail 72 affixed to the lower and upper horizontal U-shaped bends 65a, 65b.

While the cradle 60 is illustrated and described as having various features of the upstanding rail 64, it will be understood that the particular features and components of the rail are merely an example of an embodiment of the upstanding rail 64 and other known configurations could be employed without departing from the scope of this invention.

The base 62 is mounted to the top of the lower horizontal U-shaped bend 65a of the frame piece 65 and may comprise a ramped portion 63 positioned in the front portion of the base 62 extending across the opening 66.

An axle 67 extending parallel to the front edge of the base 62 extending across the opening 66 is mounted to the upwardly extending rail 72. The wheels 68 are rotatably mounted to opposing sides of the axle 69 and secured by cotter pins 69 or the like.

The first mounting portion 70 comprises a pair of C-shaped brackets forming a slot 73 having a through hole 71 in the lower part of the C-shaped bracket. The C-shaped brackets are mounted to the vertical portion of the vertical U-shaped bends 65c, 65d of the frame piece 65 such that the slots 73 face outwards, as illustrated.

The second mounting portion 26 of the handle 10 comprises a U-shaped laterally extending arm 36 and swivel mount having a socket arm 32 and stem arm 34 which rotatably mounts the laterally extending arm 36 to the handle 10.

The stem arm 34 extends perpendicularly from the laterally extending arm 36 and is received by the socket arm 32 such that the socket arm 32 may swivel with respect to the stem arm 34 or vice versa. The socket arm 32 may have a swivel locking pin 33 which selectively engages a swivel locking port 35 formed in the stem arm 34 such that when the swivel locking pin 33 engages the swivel locking port 35, the socket arm 32 is prevented from swiveling with respect to the stem arm 34.

The laterally extending arm 36 of the second mounting portion 26 comprises retainers 40 mounted to the end of the legs of the U-shaped laterally extending arm 36 that are configured to be received by the corresponding slots 73 in the first mounting portion 70 as illustrated. A least one of the retainers 40 may have a V-shaped flange 38 mounted thereto to assist in inserting the retainers 40 into the corresponding slots 73.

The second mounting portion 26 may further comprise cradle locking pins 42 mounted to the retainers 40 that are configured to selectively engage the corresponding through holes 71 formed in the C-brackets of the first mounting portion 70. While one example of the retainers 40 are shown as the cradle locking pins 42, other locking and/or retaining devices can be used to fix the position of the second mounting portion 26 with respect to the first mounting portion 70 without departing from the scope of this invention.

The lever arm 24 is connected to the lower portion of the socket arm 32 such that an acute angle is formed between the lever arm 24 and the socket arm 32. A gusset 29 may extend between the lever arm 24 and socket arm 32 to strengthen to connection there between. A lever arm grip 25 may be mounted to the end of the lever arm 24 such that it is perpendicular to the lever arm 24. A foot rest 28 which is parallel to the lever arm grip 25 is connected the lower portion of the socket arm 32 by a foot arm 27 which extends from the socket arm 32 perpendicularly. The lever arm 24, socket arm 32 and foot arm 27 all lie in substantially the same plane.

A handle axle 32 is mounted through the bottom of the socket arm 32 and the at least one wheel 22 is mounted to the handle axle 21 and secured by a cotter pin 23 or the like.

Figure 3:
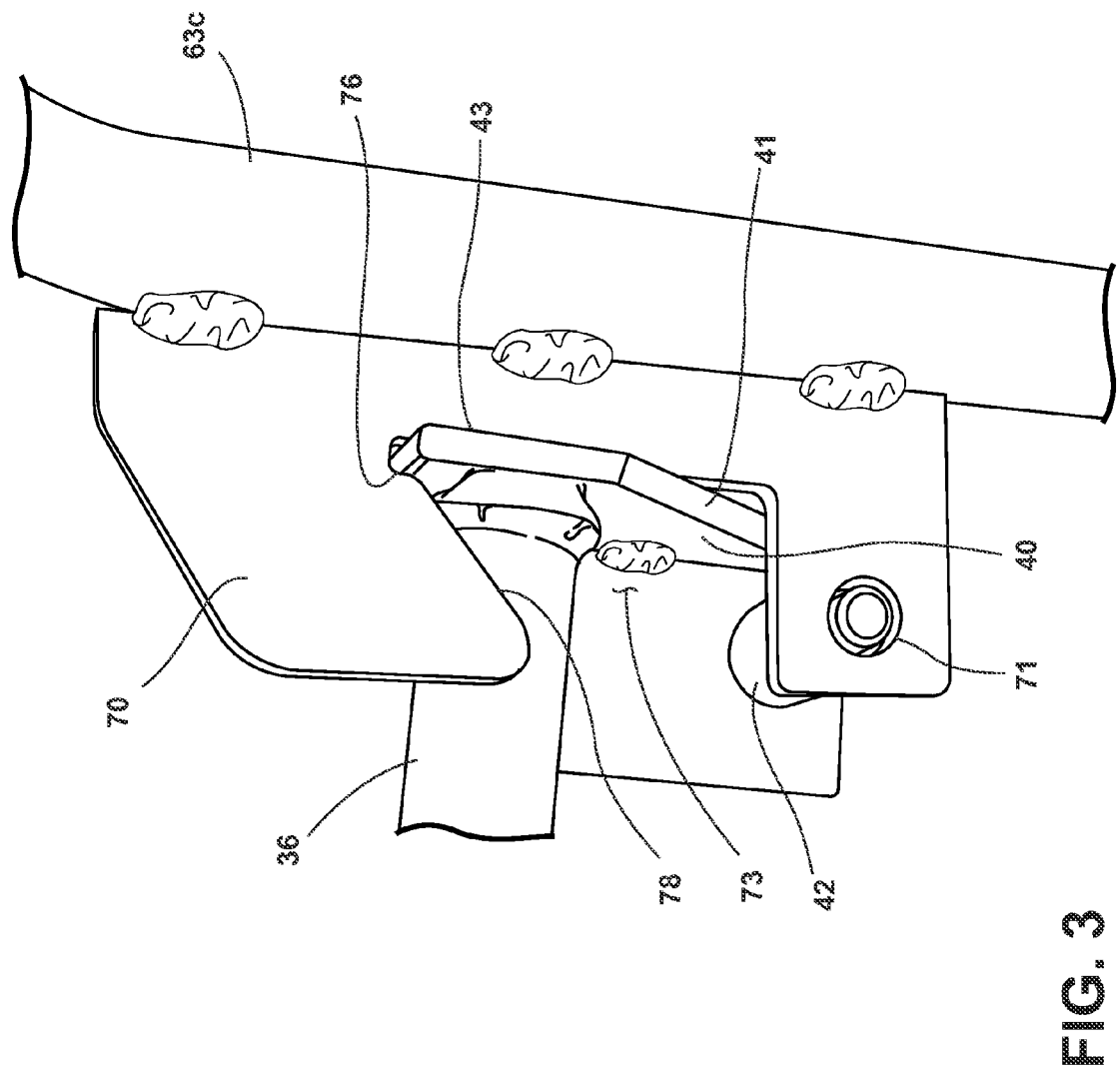
FIG. 3 is a perspective view of a portion of the engaged first and second mounting portions according to an embodiment of the invention.

FIG. 3 shows a perspective view of a portion of the engaged first and second mounting portions 70, 26 to better illustrate the engaged connection. The first mounting portion 70 includes a notch 76 formed in the upper corner of the slots 73 which corresponds to the thickness of the retainers 40 and an inclined surface 78 formed in the C-brackets at the upper portion of the slots 73. The retainers 40 have an upper rectangular portion 43 and a lower triangular portion 41 configured such that when the retainer 40 is received in the notch 76 and the cradle locking pin 42 is received by the through hole 71, the sloping surface of the triangular portion 41 is in contact with the first mounting portion 70 at the bottom of the slot 73. The notch 76, inclined surface 78 and cradle locking pin 42 engaged with through hole 71 prevent the retainer 40 from being accidently removed from the slot 73.

FIG. 4A and FIG. 4B show a perspective view of the cradle locking pins 42, retainer 40 and first mounting portion 70. The retainer 40 may further comprise first and second guiding tabs 44, 45 having first and second guide holes 48, 49 and a locking tab 47. The cradle locking pin 42 is inserted through the guide holes 48, 49 in the guiding tabs 44, 45 over the locking tab 47. A protrusion 46 extends perpendicularly from the cradle locking pin 42. When the locking pin 42 is engaged with the through hole 71 in the first mounting portion 70, the cradle locking pin 42 may be rotated such that the protrusion 46 and locking tab 47 prevents the cradle locking pin 42 from being removed from the through hole 71, as shown in FIG. 4A. To remove the cradle locking pin 42, the cradle locking pin 42 is rotated such that the protrusion 46 may pass over the locking tab 47 to disengage the through hole 71, as shown in FIG. 4B.

Figure 5:
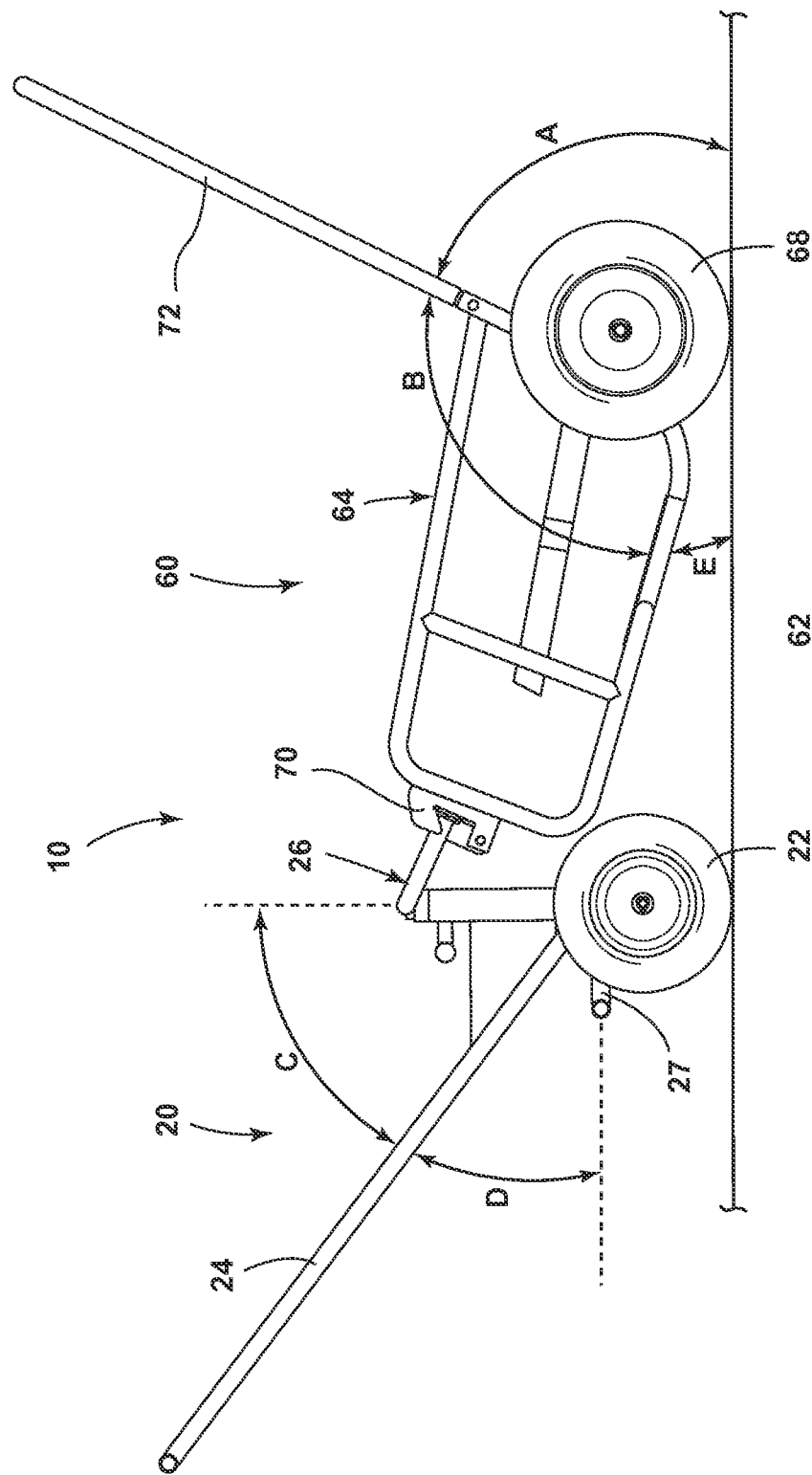
FIG. 5 is an elevation view of the dolly of FIG. 1A according to an embodiment of the invention.

FIG. 5 shows an elevation view of the dolly 10 on a surface S with the handle 20 and cradle 60 engaged. The upwardly extending rail 72 forms an acute angle A with respect to the surface S and an obtuse angle B with respect to the base 62. The lever arm 24 forms an acute angle C with respect to the swivel arm 32 of the second mounting portion 26 as well as an acute angle D with respect to the foot arm 27. When the first mounting portion 70 is engaged with the second mounting portion 26, the base 62 is inclined with respect to the surface S to form an acute angle E.

In one example embodiment, the acute angle A is in the range of 65°, the obtuse angle B is in the range of 110°, the acute angle C is in the range of 52.5°, the acute angle D is in the range of 37.5°, and the acute angle E is in the range of 25°. It will be understood that the angles may be in the range of +/−10° and may be optimized for the best leverage using the lever arm 24, the height of the leverage arm 24 with respect to the surface S and the center of gravity a load positioned in the cradle 60. Furthermore, the components of the dolly making up each of the angles, A, B, C, D and E could be adjustably mounted to one another to make the angles A, B, C, D and E adjustable through a range of angles in a manner that would be apparent to one skilled in the art.

It will be understood that the dolly 10 may be constructed from a variety of material including but not limited to metal tubing such as 13 gage Electric Welded steel—ASTM.A 513 CR Type 2 Tubes, heavy gauge sheet metal, hot or cold rolled steel, plastics, composites and other ferrous or non-ferrous materials. It will further be understood that the different dolly components by be formed from a variety of manufacturing methods well known in the art including but not limited to mandrel bending, tube coping, laser cutting, milling, welding and cold saw cutting.

Figure 6A:
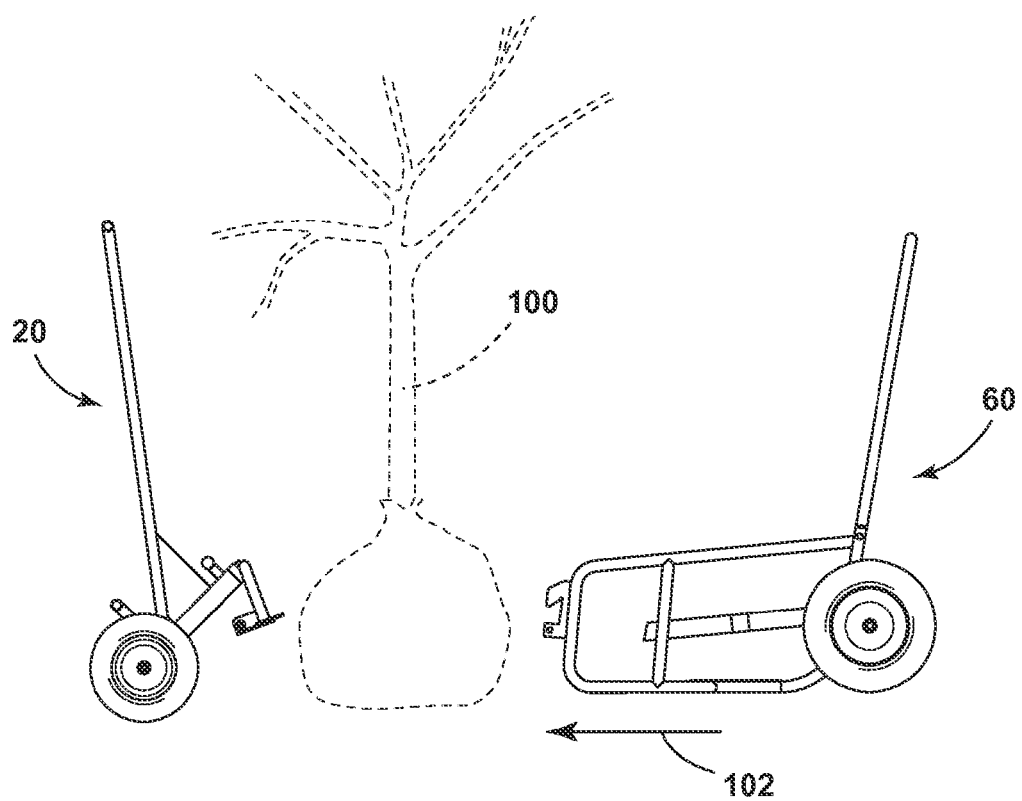
FIG. 6A is an elevation view of the handle separated from the cradle and positioned to place a load in the cradle according to an embodiment of the invention.
Figure 6B:
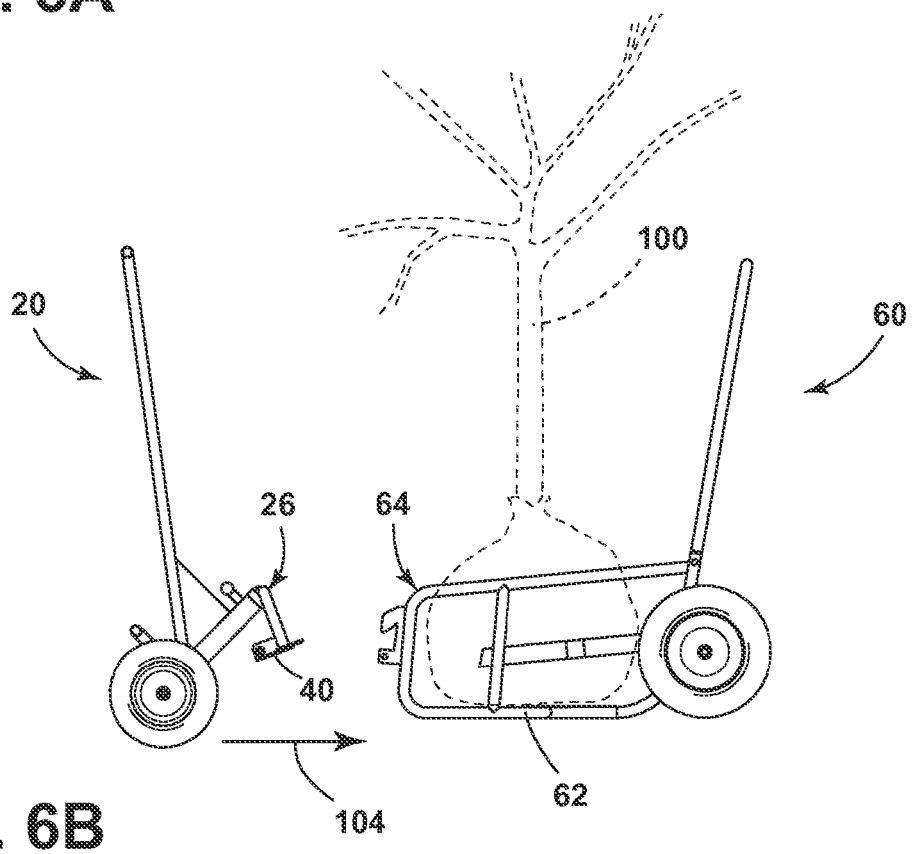
FIG. 6B is an elevation view of the handle separated from the cradle with the load positioned in the cradle according to an embodiment of the invention.
Figure 6C:
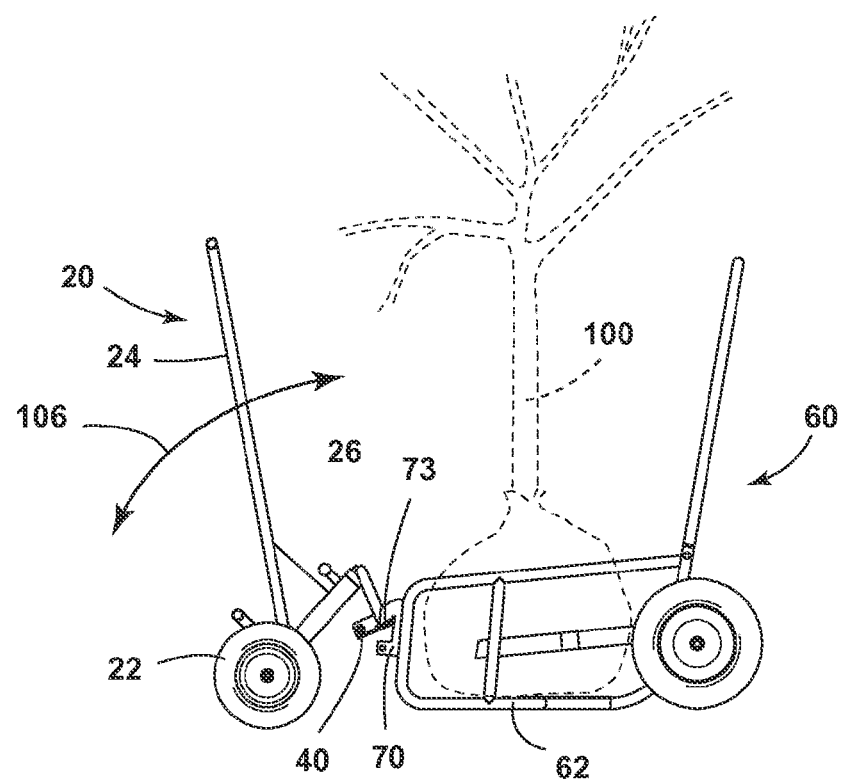
FIG. 6C is an elevation view of the handle brought into alignment with the forward portion of the cradle according to an embodiment of the invention.

In operation, the cradle 60 is position by a user in front of a load 100 as indication by arrow 102 while the handle 20 is disengaged and separated from the cradle 60 as shown in FIG. 6A. The load 100 is then positioned on the base 62 of the cradle 60 by a user such that is located within the upstanding rail 64. The handle 20 is then brought into alignment with the forward portion of the cradle 60 by a user as indicated by arrow 104 and shown in FIG. 6B. The second mounting portion 26 of the handle 20 is the rotated about the at least one wheel 22 by a user using the lever arm 24 as indicated by arrow 106 to bring it into a position adjacent to the first mounting portion 70 of the cradle 60 such that the retainers 40 are received in the slots 73, as shown in FIG. 6C. It is preferable that the swivel locking pin engages the swivel locking port during this step so that the socket arm is prevented from swiveling with respect to the stem arm and insertion of the retainers 40 into the slots 73 is simplified.

Figure 6D:
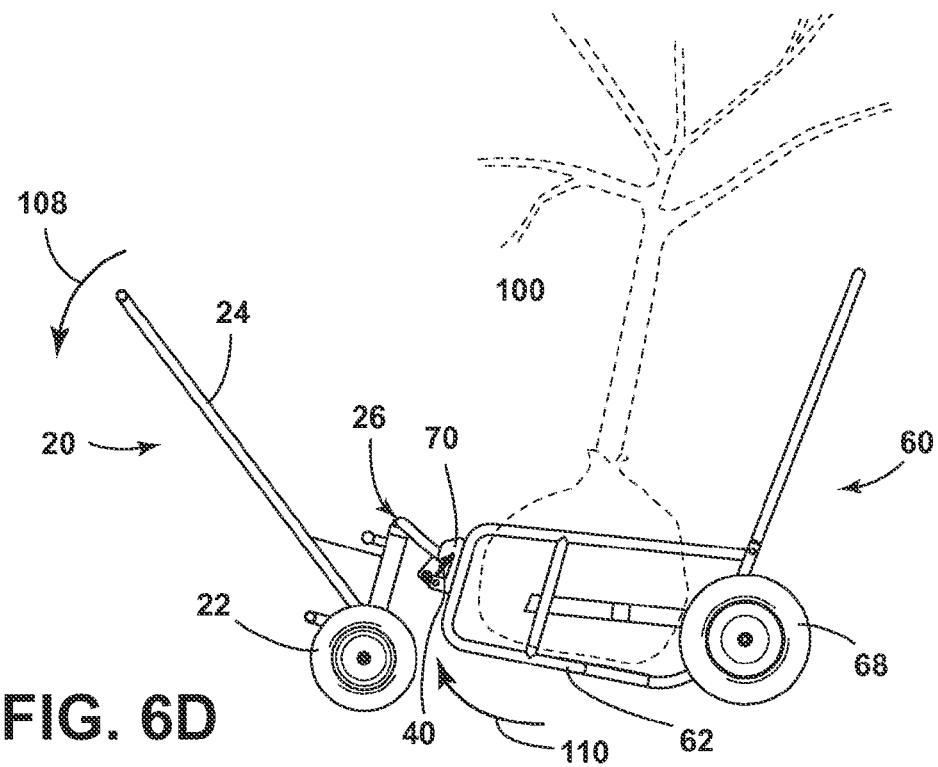
FIG. 6D is an elevation view of the handle being rotated to bring the first mounting portion into engagement with the second mounting portion according to an embodiment of the invention.
Figure 6E:
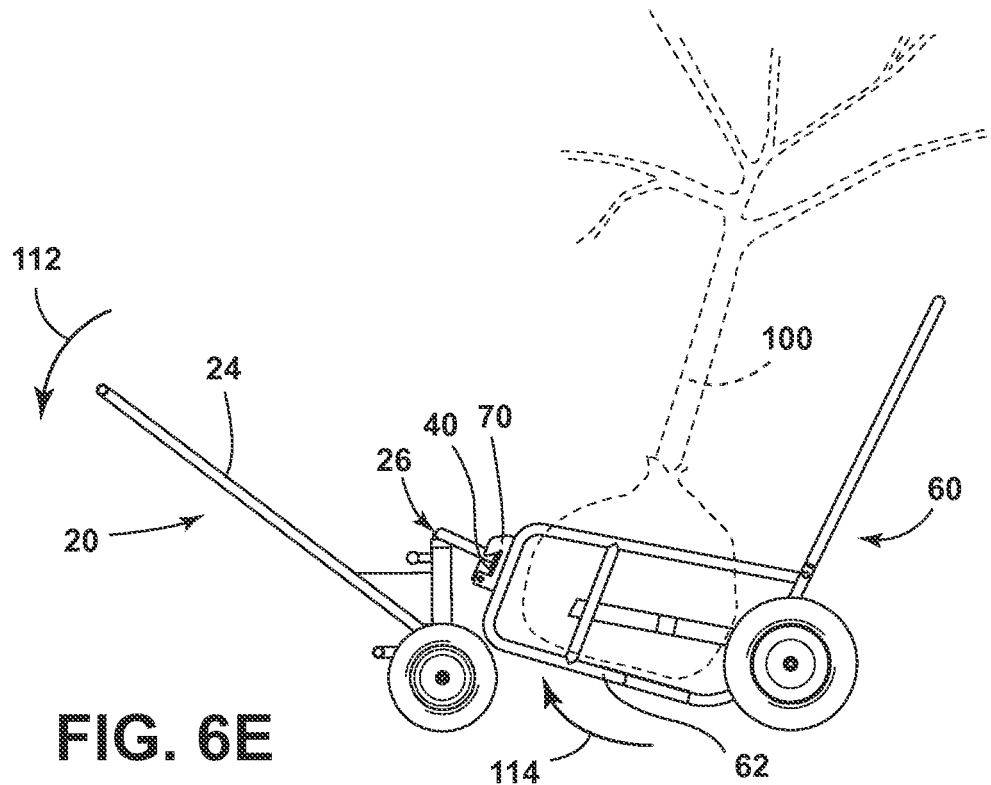
FIG. 6E is an elevation view of the handle and cradle in detachable engagement according to an embodiment of the invention.
Figure 6F:
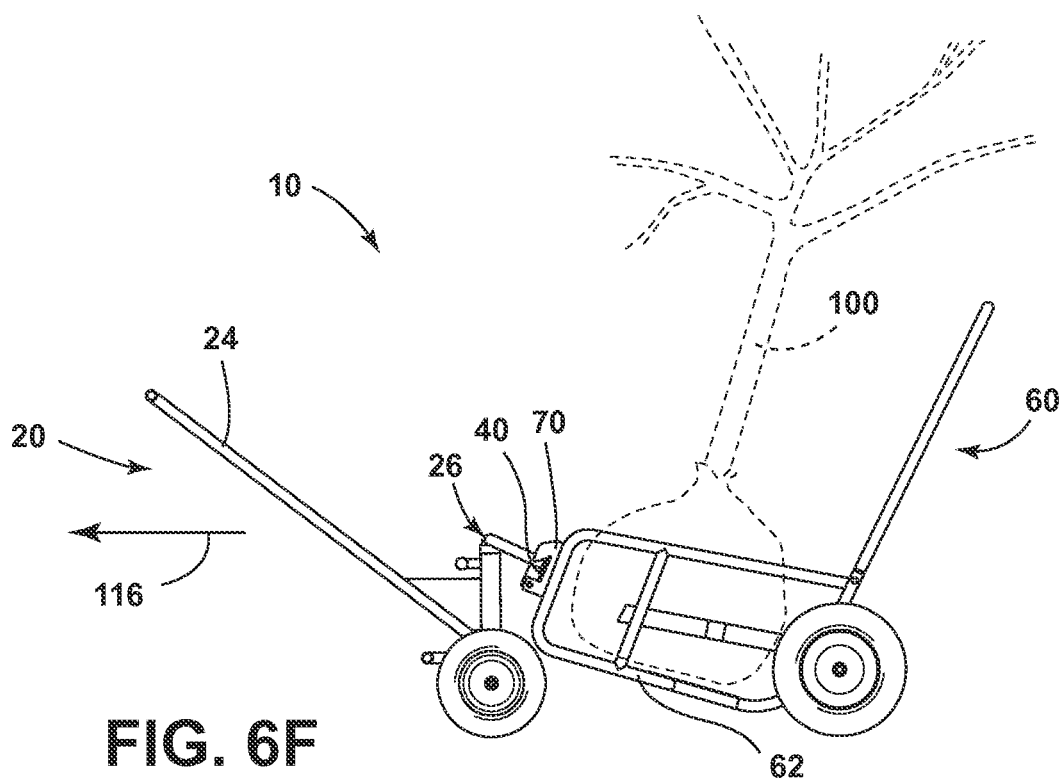
FIG. 6F is an elevation view of the handle and cradle being moved as a unit to transport a load according to an embodiment of the invention.

The lever arm 24 is then rotated downward about the at least one wheel 22 as indicated by arrow 108 to bring the retainers 40 of the second mounting member 26 into engagement with the first mounting member 70 of the cradle 60, which in turn, beings to lift and rotate the base 62 and load 100 about the pair of wheels 68 as indicated by arrow 110 and shown in FIG. 6D. A user may place a foot or both feet on the foot rest while pulling down on the lever arm grip of the lever arm 24 to assist in rotating the lever arm 24 downwards. The downward rotation of the lever arm 24 about the least one wheel 22 is continued as indicated by arrow 112, lifting the base 62 and load 100 as indicated by arrow 114 until retainers 40 of the second mounting member 26 are in full engagement with the first mounting member 70 of the cradle 60 as shown in FIG. 6E. Once the first and second mounting member 26, 70 are fully engaged and the cradle locking pins are brought into engagement with the through holes (not shown), the handle 20 is in a pulling position and the load 100 may be transported by the dolly 10 as indicated by arrow 116 and shown in FIG. 6F.

To remove the load from the dolly 10, the cradle locking pins are disengaged from the through holes (not shown) and the process is reversed.

Figure 7:
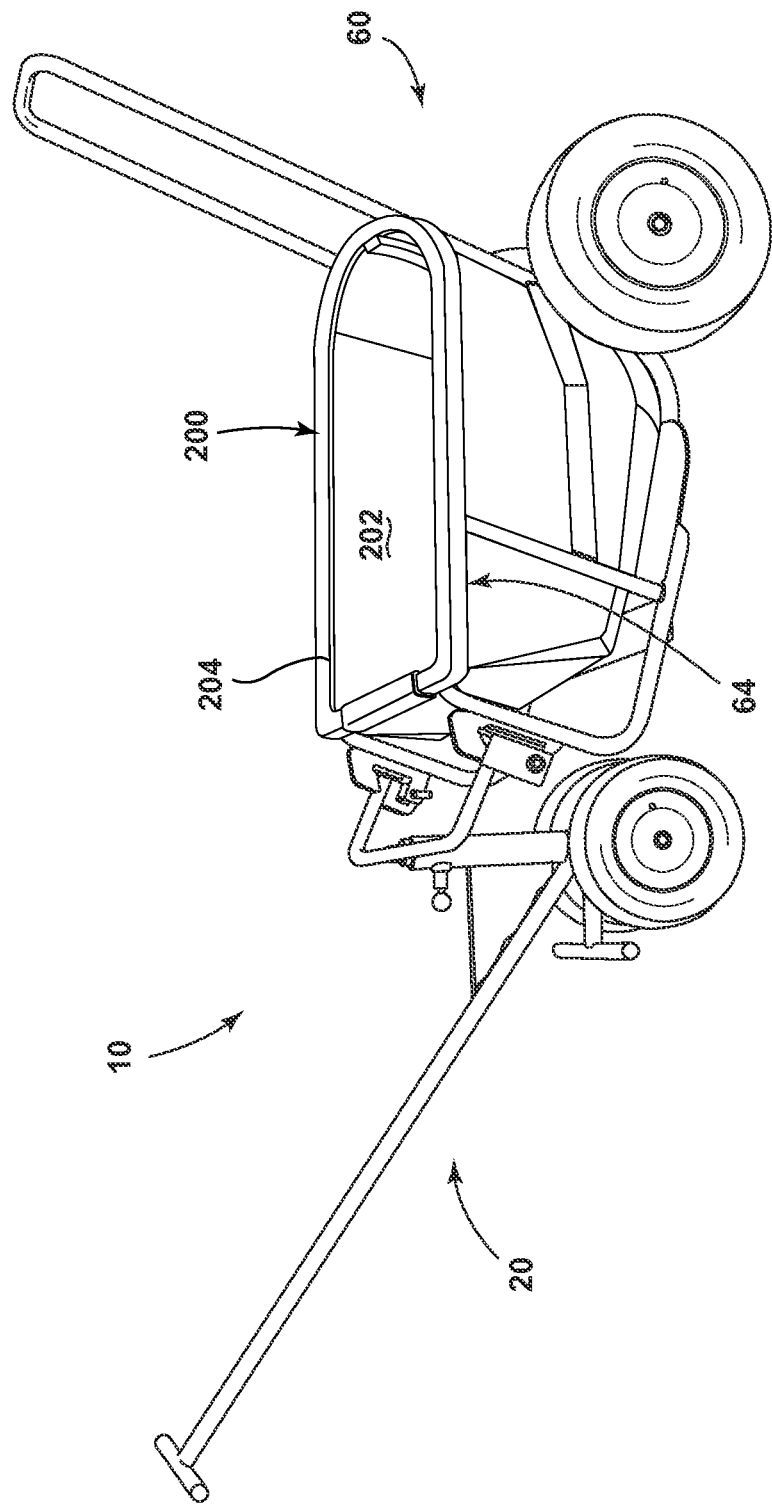
FIG. 7 is a perspective view of the dolly having a cradle liner according to another embodiment of the invention.

FIG. 7 shows the dolly 10 having a liner 200 positioned within the upstanding rail 64 of the cradle 60 to form an open top contained area 202 according to another embodiment of the invention. The liner 200 may have a lip 204 that wraps over the upper portion of the upstanding rail 64 to position the liner 200 in the cradle 60. The liner 200 may be in the form of a polymeric-molded container that is configured to be selectively removable from the cradle 60. The liner 200 may be formed from metal or plastic using stamping or injection molding respectively. The liner 200 can be used to transport loose materials such as mulch.

Figure 8:
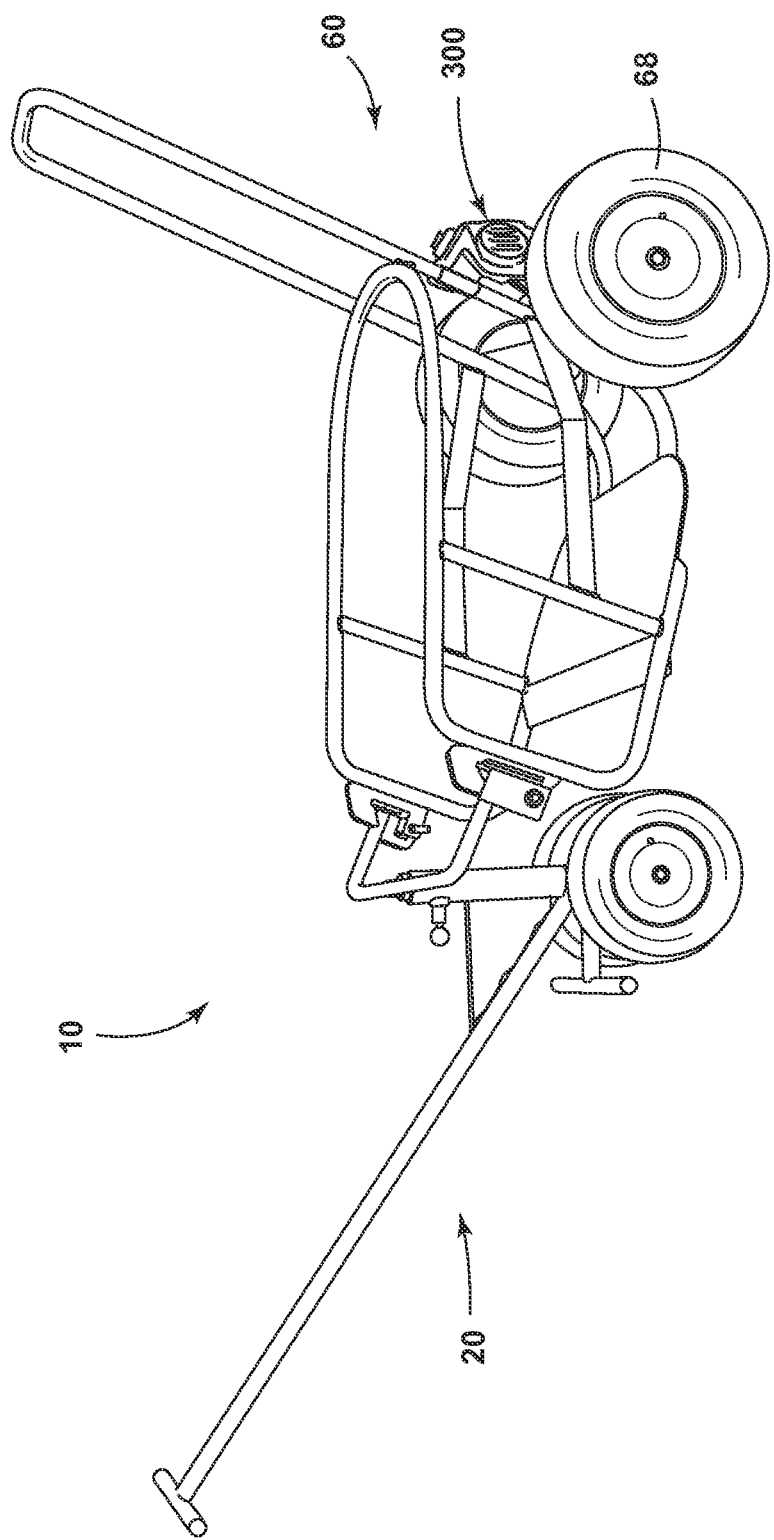
FIG. 8 is a perspective view of the dolly having a motor according to another embodiment of the invention.

FIG. 8 shows the dolly 10 having a motor 300 operably mounted to the cradle 60 to drive the pair of wheels 68 according to another embodiment of the invention. The dolly 10 also may be equipped with all the necessary components to operably operate the motor 300 such as a gas tank or battery, gear box and throttle control. The motor 300 may assist the user in transporting heavy loads in the dolly 10.

Figure 9A:
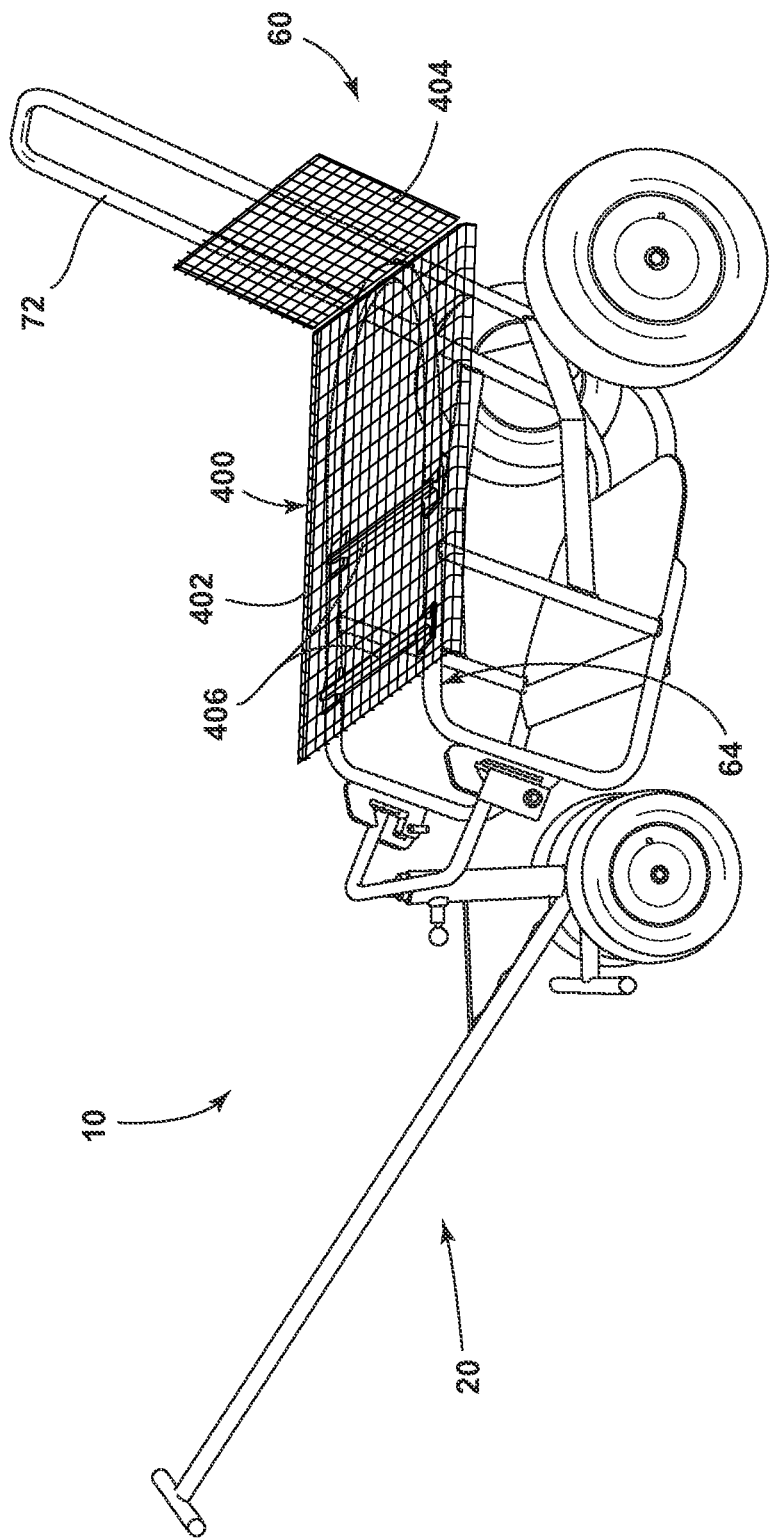
FIG. 9A is a perspective view of the dolly having cradle cover according to another embodiment of the invention.
Figure 9B:
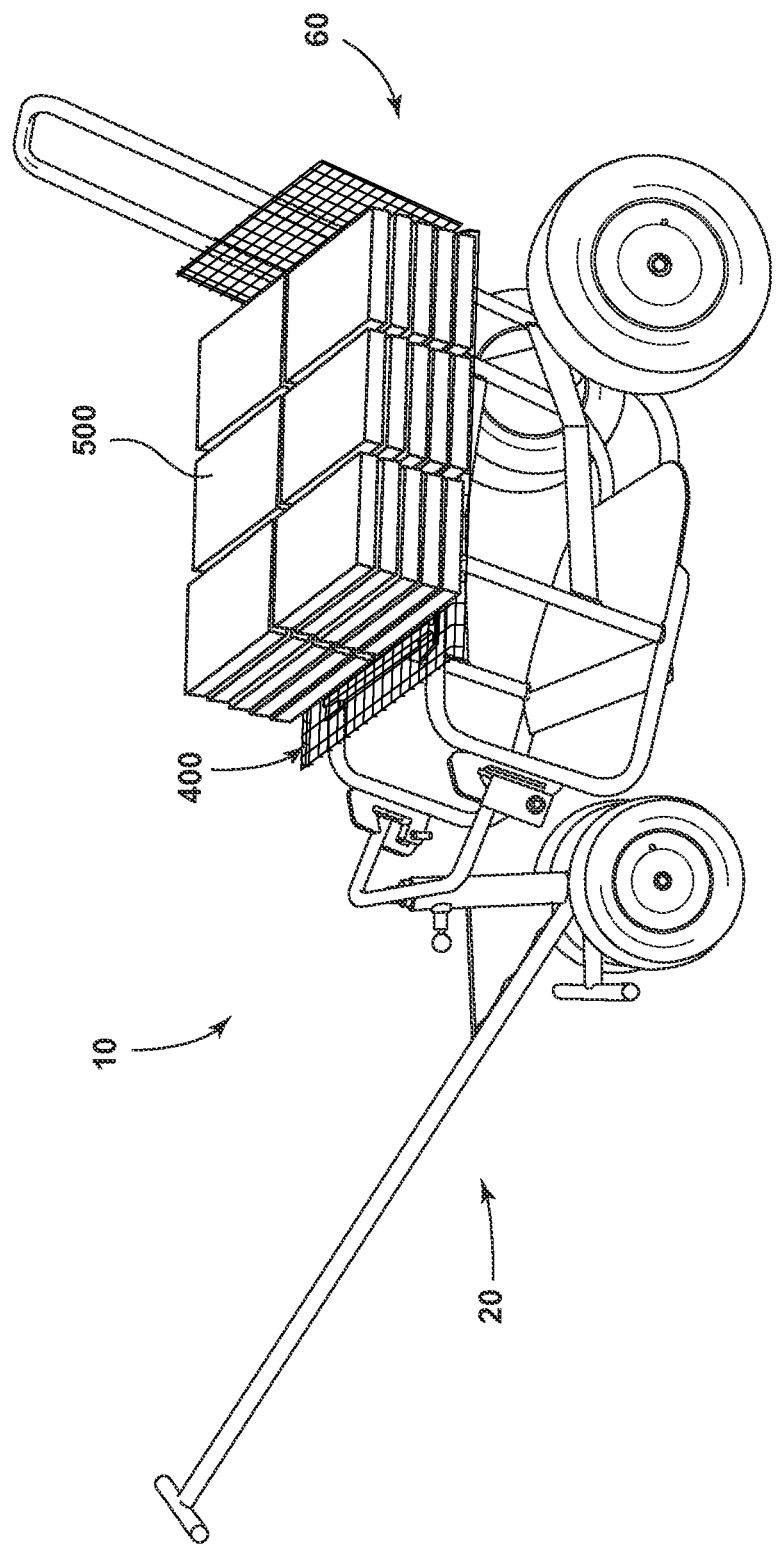
FIG. 9B is a perspective view the dolly of FIG. 9A carrying a load on the cradle cover according to an embodiment of the invention.

FIG. 9A shows the dolly 10 having cradle cover 400 according to another embodiment of the invention. The cradle cover 400 comprises a horizontal portion 402, an upstanding portion 404 and cross supports 406. The horizontal portion 402 may rest on the top of the upstanding rail 64 and the upstanding portion 404 may rest against the upwardly extending rail 72. The cross supports 406 may mount to the upstanding rail 64 to support the cradle cover 400 and to secure the cradle cover 400 to the cradle 60. The cradle cover 400 may be used as a flat surface to stack objects such as pavers 500, as shown in FIG. 9B. The cradle cover 400 may be formed from sheets of wire mesh, sheet metal, durable plastic or the like.

The embodiments of the invention provide for a number of benefits including that the dolly 10 provides a convenient method for transporting a heavy load. Once the load is positioned in the cradle 60, a single user may lift the load using the leverage provided by the handle 20. The handle 20 provides optimum leverage so that even very heavy loads may be lifted by the user. Once lifted, the handle 20 engages the cradle 60 so that the load is balanced in the cradle 60 without the assistance of the user. Furthermore, when the handle 20 is engaged with the cradle 60, the base 62 is inclined with respect to a ground surface, which moves the center of gravity of the load toward the pair of wheels 68 located at the rearward portion of the cradle 60, thereby making the dolly 10 and load easier to pull. The swivel mount allows for easy steering of the dolly 10 during pulling and the upwardly extending rail 72 allows for a second user to push the dolly 10 while the other user pulls the dolly 10 from the handle 20.

While the invention has been specifically described in connection with certain specific embodiments thereof, it is to be understood that this is by way of illustration and not of limitation. Reasonable variation and modification are possible with the scope of the foregoing disclosure and drawings without departing from the spirit of the invention which, is defined in the appended claims. Hence, specific dimensions and other physical characteristics relating to the embodiments disclosed herein are not to be considered as limiting, unless the claims expressly state otherwise.

What is claimed is:

1. A dolly for transporting a load comprising:
   a cradle comprising a base having an upstanding rail extending upwardly from a perimeter thereof, the rail terminating at a forward portion of the base and defining an opening extending generally the width of the base, a pair of wheels rotatably mounted to cradle at a rearward portion thereof, and a first mounting portion positioned at a forward portion of the cradle;
   a handle comprising at least one wheel rotatably mounted thereto, a lever arm, and a second mounting portion positioned at a non-parallel angle with respect to the lever arm and is configured for detachable engagement with the first mounting portion on the cradle when the second mounting portion is rotated about the at least one wheel on the handle to position the second mounting portion in register with the first mounting portion on the cradle;
   whereby, when the load is positioned on the base within the cradle, the handle is bought in alignment with the forward portion of the cradle, the second mounting portion of the handle can be rotated into position about the at least one wheel on the handle adjacent to the first mounting portion on the cradle and rotated into detachable engagement with the first mounting portion, so that the handle and the cradle can be moved as a unit to transport the load, and, when the load is located at a desired end location, the handle can be oppositely rotated with respect to the cradle to disengage the second mounting portion from the first mounting portion to allow the load to be easily removed from within the cradle.

2. The dolly of claim 1 wherein the cradle further comprises an upwardly-extending rail mounted at a rearward portion of the base and at a generally obtuse angle with respect to the base.

3. The dolly of claim 2 wherein the upwardly-extending rail comprises an inverted U-shaped member which can act as at least one of a handle or a backstop for a load positioned within the cradle.

4. The dolly of claim 1 wherein the non-parallel angle between the lever arm and the second mounting portion comprises an acute angle.

5. The dolly of claim 1 wherein, when the first and second mounting portions are engaged, the handle can be further rotated to a pulling position, wherein the base of the cradle is elevated off of a ground surface, and the handle can be used to pull the cradle across the ground surface on the at least one wheel on the handle and the pair of wheels on the cradle.

6. The dolly of claim 1 wherein a forward edge of the base on the cradle has a ramped portion thereon to facilitate positioning of the load onto the base.

7. The dolly of claim 1 wherein the second mounting portion comprises a laterally extending arm having retainers on each end thereof configured to interengage with corresponding portions on the first mounting portion.

8. The dolly of claim 7 and further comprising a swivel mount which rotatably mounts the laterally extending arm to the handle, so that the lever arm can be used to steer the at least one wheel on the handle.

9. The dolly of claim 7 and further comprising at least one of a lock pin or an opening associated with each of the retainers on each end of the laterally-extending arm for securely fastening the retainers to the other of the at least one of a lock pin or an opening on the first mounting portion of the cradle.

10. The dolly of claim 1 and further comprising a foot rest mounted to the handle generally adjacent the at least one wheel thereof.

11. The dolly of claim 10 wherein the foot rest is positioned at a foot rest angle with respect to the lever arm, and the foot rest angle is less than the non-parallel angle of the lever arm with respect to the second mounting portion.

12. The dolly of claim 1 wherein, when the second mounting portion of the handle is engaged with the first mounting portion of the cradle, the handle can be rotated to incline the base with respect to a ground surface, moving the center of gravity of the load toward the pair of wheels located at the rearward portion of the cradle.

13. The dolly of claim 1 wherein a portion of the upstanding rail of the cradle is positioned at an angle of 80 degrees with respect to the base.

14. The dolly of claim 1 wherein the base has a forward portion thereof, and a forward portion of the upstanding rail extends forwardly beyond the forward portion of the base.

15. The dolly of claim 1 wherein and further comprising a motor operably connected to at least one of the at least one wheel on the handle or the pair of wheels on the cradle to provide powered movement to the dolly.

16. The dolly of claim 1 wherein the lever arm is positioned at an angle between 50 and 60 degrees with respect to the second mounting portion.

17. The dolly of claim 1 and further comprising a liner configured to be positioned on the base within the upstanding rail of the cradle.

18. The dolly of claim 17 wherein the liner comprises a polymeric molded container which can be removably placed into the cradle.

* * * * *